(12) United States Patent
Muscocea

(10) Patent No.: US 10,315,680 B2
(45) Date of Patent: Jun. 11, 2019

(54) DEVICE FOR MANUALLY LIFTING A LOAD WITH A LEVER FOR A CART, SUITCASE AND THE LIKE

(71) Applicant: Anghel Muscocea, Charenton-le-Pont (FR)

(72) Inventor: Anghel Muscocea, Charenton-le-Pont (FR)

(*) Notice: Subject to any disclaimer, the term of this patent is extended or adjusted under 35 U.S.C. 154(b) by 0 days.

(21) Appl. No.: 15/560,780

(22) PCT Filed: Mar. 22, 2016

(86) PCT No.: PCT/FR2016/000055
§ 371 (c)(1),
(2) Date: Sep. 22, 2017

(87) PCT Pub. No.: WO2016/151206
PCT Pub. Date: Sep. 29, 2016

(65) Prior Publication Data
US 2018/0079440 A1    Mar. 22, 2018

(30) Foreign Application Priority Data
Mar. 25, 2015 (FR) ...................... 15 00592

(51) Int. Cl.
*B62B 5/02* (2006.01)
*A45C 5/14* (2006.01)
(Continued)

(52) U.S. Cl.
CPC ............... *B62B 5/02* (2013.01); *A45C 5/146* (2013.01); *A45C 13/262* (2013.01); *B62B 1/02* (2013.01);
(Continued)

(58) Field of Classification Search
CPC .. B62B 5/02; B62B 1/02; B62B 5/023; A45C 5/146; A45C 13/262; A45C 2005/147
(Continued)

(56) References Cited

U.S. PATENT DOCUMENTS 878,546 A    2/1908 Lyon
1,654,188 A * 12/1927 Phillips ................... B62B 5/023
280/10

(Continued)

FOREIGN PATENT DOCUMENTS

DE    10 2007 014159 A1    7/2008

*Primary Examiner* — Joseph M Rocca
*Assistant Examiner* — Conan D Duda
(74) *Attorney, Agent, or Firm* — Vorys, Sater, Seymour and Pease LLP; Vincent M DeLuca

(57) ABSTRACT

Device for manually lifting a load with a lever for a cart, suitcase and the like, making it easier to ascend and descend staircases and various obstacles, said device comprising two parts:—a first part comprising: a frame (1) secured to wheels (2), the wheels (2) and the handles (3) being fixed to the frame (1),—a second part comprising: a load support (4) secured to wheels (5), the wheels (5) and a load (12) being mounted in a fixed manner on the load support (4), the second part being able to slide with respect to the first part by the action of a telescopic lever arm (10) in order to ascend a step of a staircase in two phases, the telescopic lever arm (10) being fixed to the handles (3) by an articulation (9), a second articulation (8) connecting the telescopic lever arm (10) to a transmission (6) which is in turn connected by a third articulation (7) to the load support (4) of the second part.

8 Claims, 6 Drawing Sheets

(51) Int. Cl.
*A45C 13/26* (2006.01)
*B62B 1/02* (2006.01)
*B62B 5/06* (2006.01)
*B66F 9/06* (2006.01)

(52) U.S. Cl.
CPC ............... *B62B 5/023* (2013.01); *B62B 5/06* (2013.01); *B66F 9/06* (2013.01); *A45C 2013/267* (2013.01)

(58) Field of Classification Search
USPC .................................................... 280/5.3, 5.2
See application file for complete search history.

(56) References Cited

U.S. PATENT DOCUMENTS

| | | | | |
|---|---|---|---|---|
| 2,243,915 A * | 6/1941 | Mueller | ................... | B62B 5/02 280/47.2 |
| 2,427,482 A * | 9/1947 | Weissman | ................. | B62B 9/02 206/818 |
| 2,680,026 A * | 6/1954 | Cushman | ................ | B62B 1/002 280/43.2 |
| 3,052,323 A * | 9/1962 | Hopfeld | ................... | B62B 1/14 187/231 |
| 3,907,138 A * | 9/1975 | Rhodes | ..................... | B62B 1/14 414/448 |
| 4,059,285 A * | 11/1977 | McCoy | .................. | B62B 3/027 280/651 |
| 4,570,953 A * | 2/1986 | McPeak | ................. | B62B 5/023 280/47.29 |
| 4,722,538 A | 2/1988 | Freyman | | |
| 5,096,265 A * | 3/1992 | Chang | ...................... | B62B 5/02 280/43.1 |
| 5,294,158 A * | 3/1994 | Cheng | ...................... | B62B 3/02 280/641 |
| 5,328,182 A * | 7/1994 | Kuo | .......................... | B62B 5/02 280/47.21 |
| 5,829,763 A * | 11/1998 | Jeavons | ................. | B62B 5/023 280/5.3 |
| 6,454,065 B1 * | 9/2002 | Chen | ....................... | A45C 5/14 16/18 B |
| 7,100,976 B1 * | 9/2006 | Desalve | ............... | A45C 13/385 297/129 |
| 7,226,073 B1 * | 6/2007 | Zahiri | ...................... | A45C 5/14 190/115 |
| 7,500,682 B1 * | 3/2009 | Del Marmol | ........... | B62B 1/002 280/47.2 |
| 7,837,206 B1 * | 11/2010 | Lee | .......................... | A45C 5/14 280/30 |
| 8,439,371 B1 * | 5/2013 | Vazquez | ................... | B62B 5/02 180/8.2 |
| 9,095,193 B1 * | 8/2015 | Al-Hashemi | .......... | A45C 5/146 |
| 2001/0032765 A1 * | 10/2001 | Tiramani | ............... | A45C 3/001 190/115 |
| 2001/0033070 A1 * | 10/2001 | Reimers | ................. | B62B 1/045 280/651 |
| 2002/0125088 A1 * | 9/2002 | Nykoluk | ................ | A45C 5/146 190/18 A |
| 2004/0026882 A1 * | 2/2004 | Brown | ................... | A45C 5/146 280/47.34 |
| 2004/0188960 A1 * | 9/2004 | Bierma | ................... | B62B 5/023 280/5.2 |
| 2005/0110231 A1 * | 5/2005 | Brown | ..................... | A45C 5/14 280/47.26 |
| 2007/0095581 A1 * | 5/2007 | Chambliss | ............. | A61G 5/061 180/8.2 |
| 2008/0073863 A1 * | 3/2008 | Ehman | .................... | A61G 5/02 280/5.2 |
| 2008/0135366 A1 * | 6/2008 | Katz | ....................... | A45C 5/14 190/18 A |
| 2008/0164667 A1 * | 7/2008 | Fegler | ..................... | A45C 5/14 280/47.25 |
| 2008/0230339 A1 * | 9/2008 | Pereira | ..................... | A45C 5/03 190/18 A |
| 2008/0265529 A1 * | 10/2008 | Kamara | ................... | A45C 5/14 280/5.26 |
| 2009/0250889 A1 * | 10/2009 | Palmore | ................. | B62B 1/002 280/47.21 |
| 2009/0255772 A1 * | 10/2009 | Sherrell | .................. | A45C 5/146 190/18 A |
| 2010/0000805 A1 * | 1/2010 | Pan | .......................... | A45C 5/14 180/19.1 |
| 2010/0072012 A1 * | 3/2010 | Malinowski | ............. | A45C 5/14 190/8 |
| 2011/0175302 A1 * | 7/2011 | Sherman | ................. | A61G 5/066 280/5.22 |
| 2012/0175172 A1 * | 7/2012 | Bouhraoua | ........... | B62B 5/0033 180/8.2 |
| 2012/0261223 A1 * | 10/2012 | Pattni | ..................... | A45C 5/14 190/18 A |
| 2014/0077477 A1 * | 3/2014 | Hronyetz | ................. | B62B 3/02 280/659 |
| 2016/0200339 A1 * | 7/2016 | Dhand | ..................... | B62B 5/06 280/651 |

* cited by examiner

DEVICE FOR MANUALLY LIFTING A LOAD WITH A LEVER FOR A CART, SUITCASE AND THE LIKE

The present invention relates to a device for manually lifting a load with a lever for being used for a cart, a suitcase and the like.

Experience has shown that a user currently encounters difficulties when ascending and descending staircases and various obstacles with a cart or a suitcase.

The device of the invention, which solves these disadvantages, is remarkable in that the manual effort made by the user will be significantly reduced when ascending and descending staircases and various obstacles.

The present invention will be described in detail in the following with reference made to the attached drawings given only by way of example in which.

Figure 1:
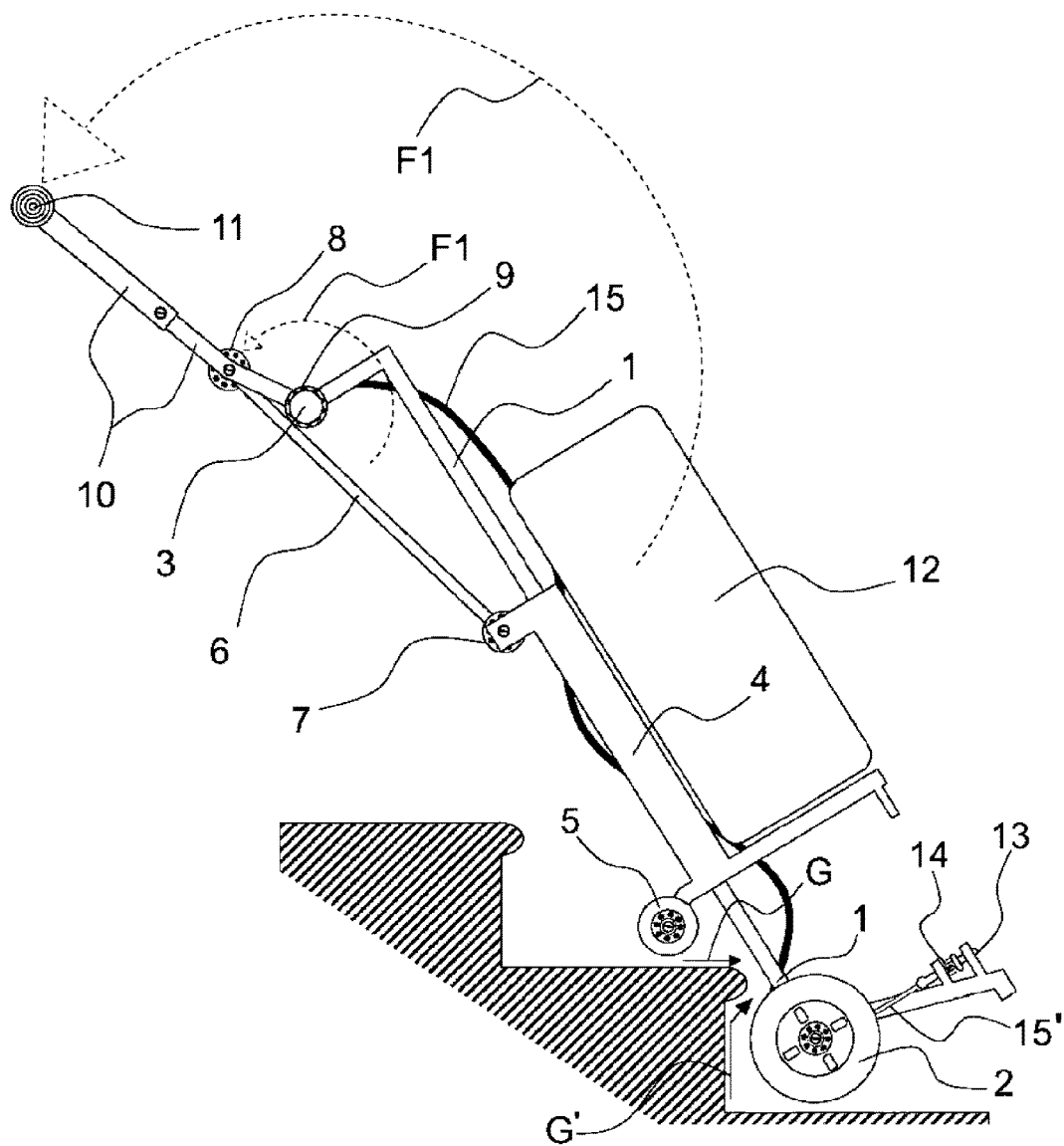
FIG. 1 shows a lateral view of a device according to the invention showing the confrontation of various steps at visible angles.

FIG. 1 shows that the device has two parts:
a first part comprising: a frame 1 integral with the wheels 2, wherein the wheels 2 and the handles 3 are fixed to the frame 1,
a second part comprising: a load support 4 integral with the wheels 5, the wheels 5 and a load 12 which is mounted in a fixed manner on the load support 4.

The second part can slide relative to the first part by the action of a telescopic lever arm 10. The action of ascending a staircase step with the device according to the invention is made in two phases in the following manner:
during the first phase by turning the telescopic lever arm 10 upward from an initial low position following a circular movement according to arrow F1, wherein the second part slides upward relative to the first part and ascends a staircase step,
and then, during the second phase, by turning the telescopic lever arm 10 downward following a circular movement according to the arrow F2 until the initial low position of this telescopic lever arm, the first part ascends for its part onto the same staircase step.

The telescopic lever arm 10 is fixed to the handles 3 by an articulation 9. A second articulation 8 connects the telescopic lever arm 10 to a transmission 6 which is connected for its part by a third articulation 7 to the load support 4 of the second part.

FIG. 1 shows that during the phase 2, by turning the telescopic lever arm 10 downward 10 according to arrow F to its initial low position the wheels 5 move the second part in a movement of translation according to arrows G-G' so that the first part can reach an angle visible on the staircase edge in order to facilitate the ascent of the first part.

Figure 2:
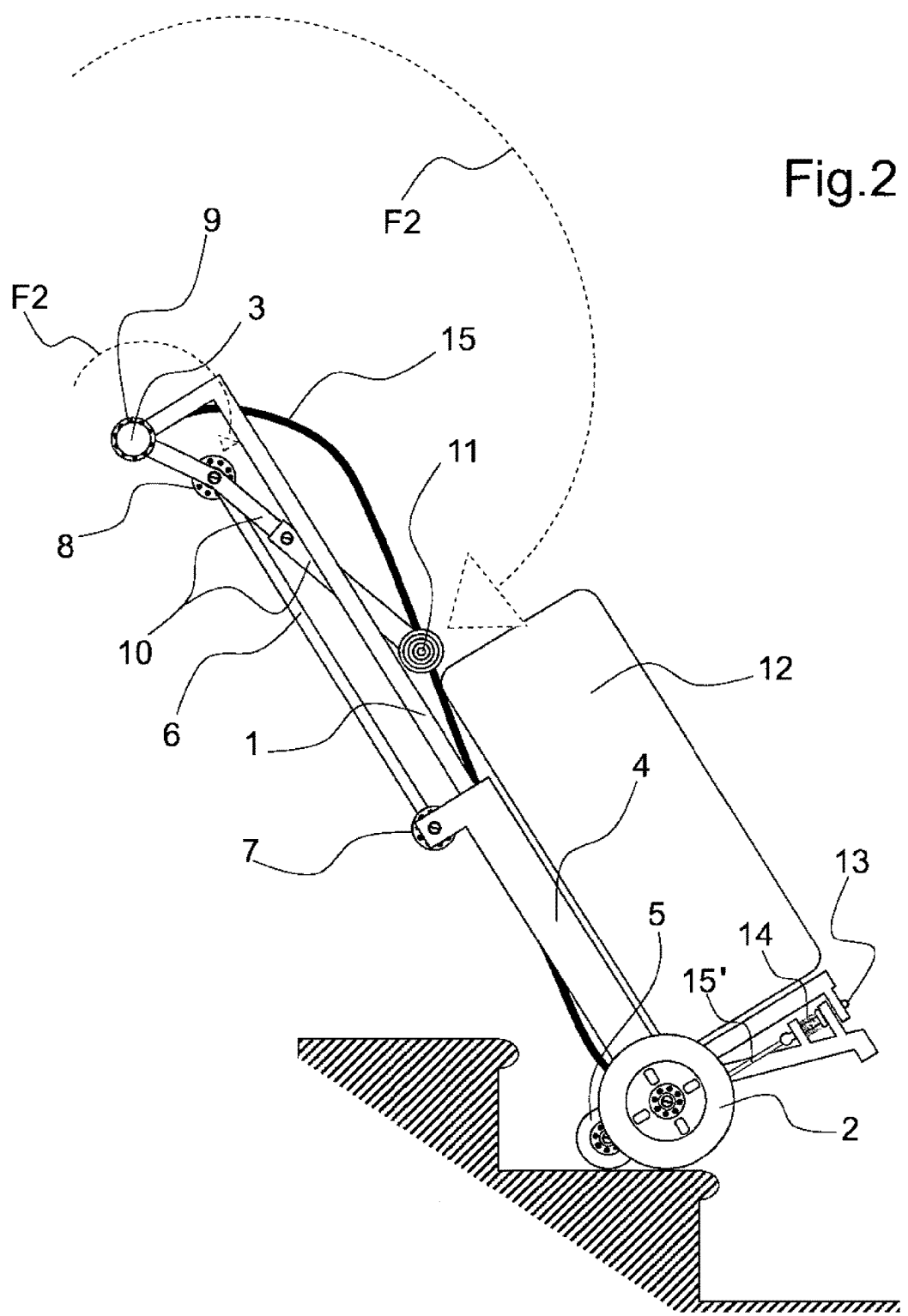
FIG. 2 shows a lateral view of the device according to the invention.
Figure 3:
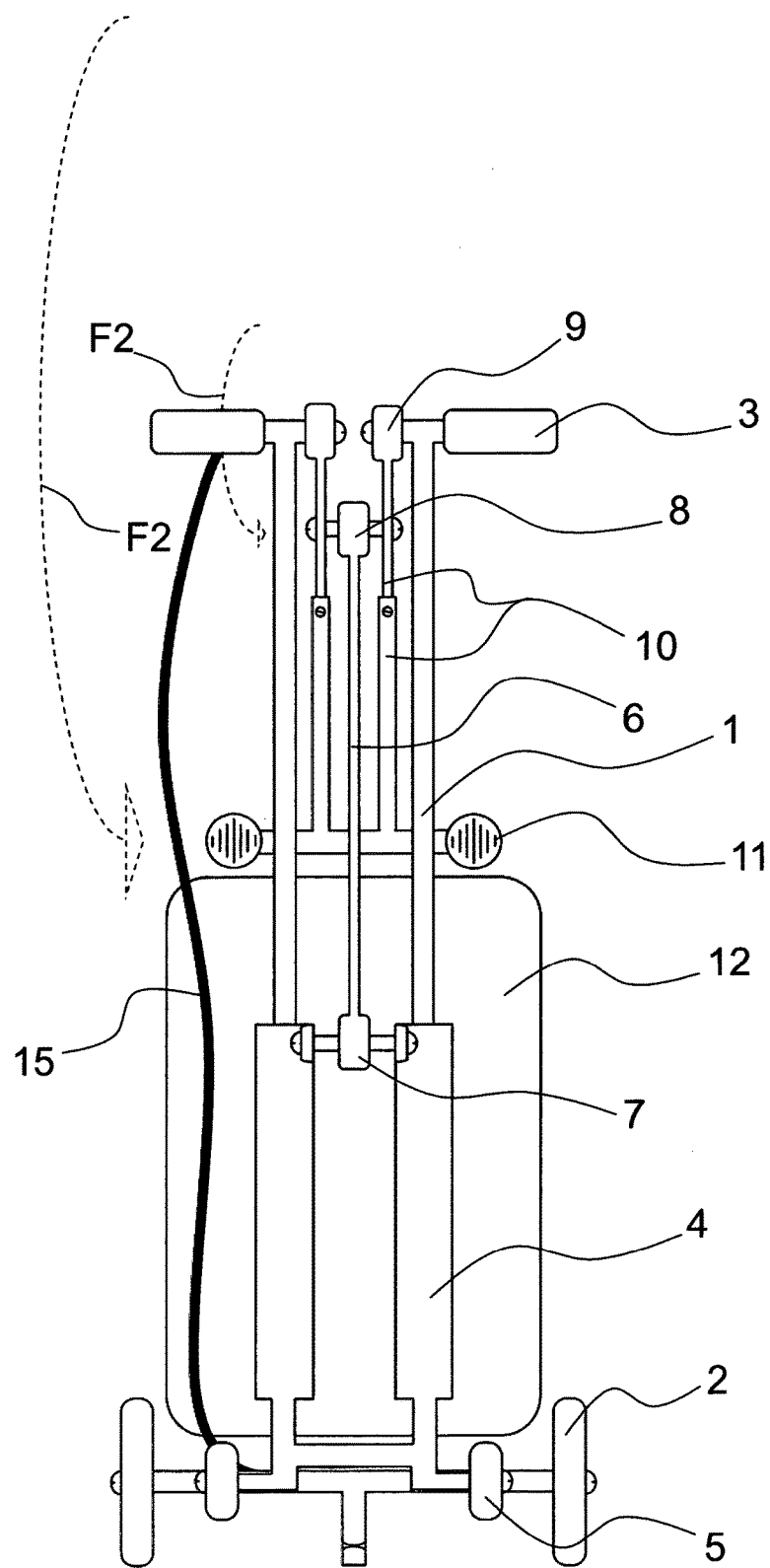
FIG. 3 shows a front view of the device according to the invention.
Figure 4:
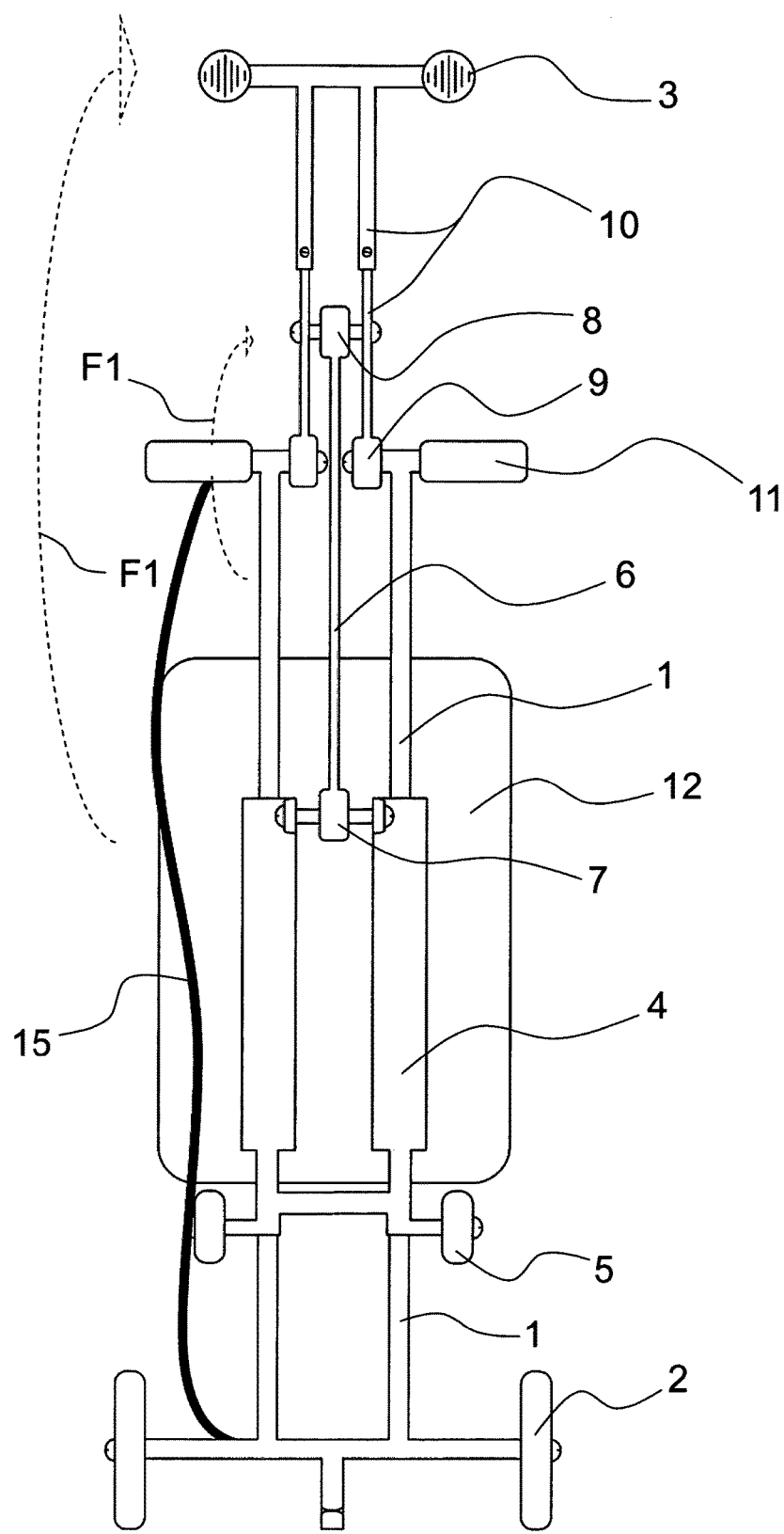
FIG. 4 shows a front view of the device according to the invention.

FIG. 2 shows that the device comprises a joining pin 13 with a spring 14 joining the frame 1 and load support 4 and allowing the device to move with its four wheels 2 and 5 on a plane surface.

Referring again to FIG. 1, it can be seen that the joining pin 13 is released by a cable 15 and rod 15', allowing the load support 4 to move relative to the frame 1.

Figure 5:
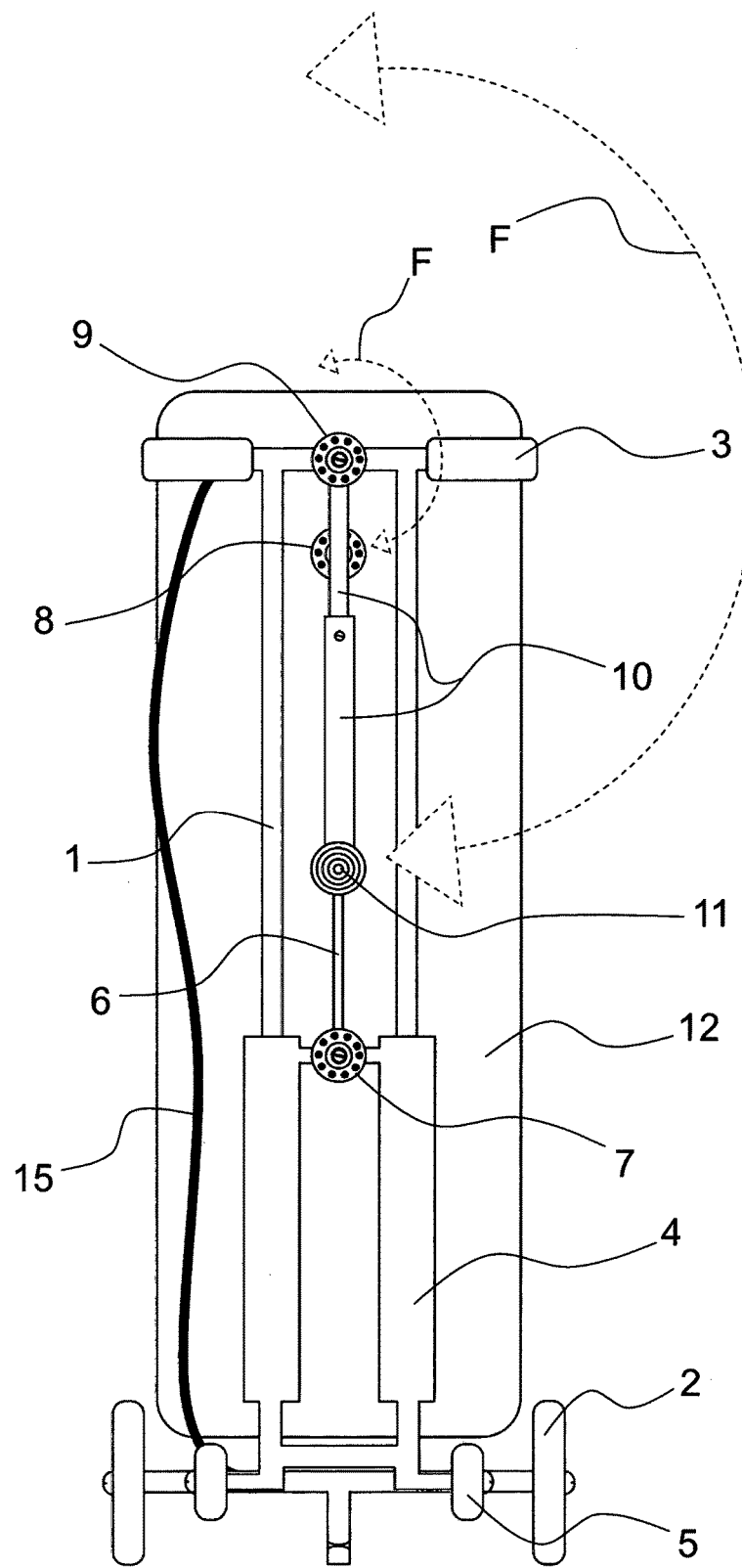
FIG. 5 shows a front view of the device according to the invention with the largest load.
Figure 6:
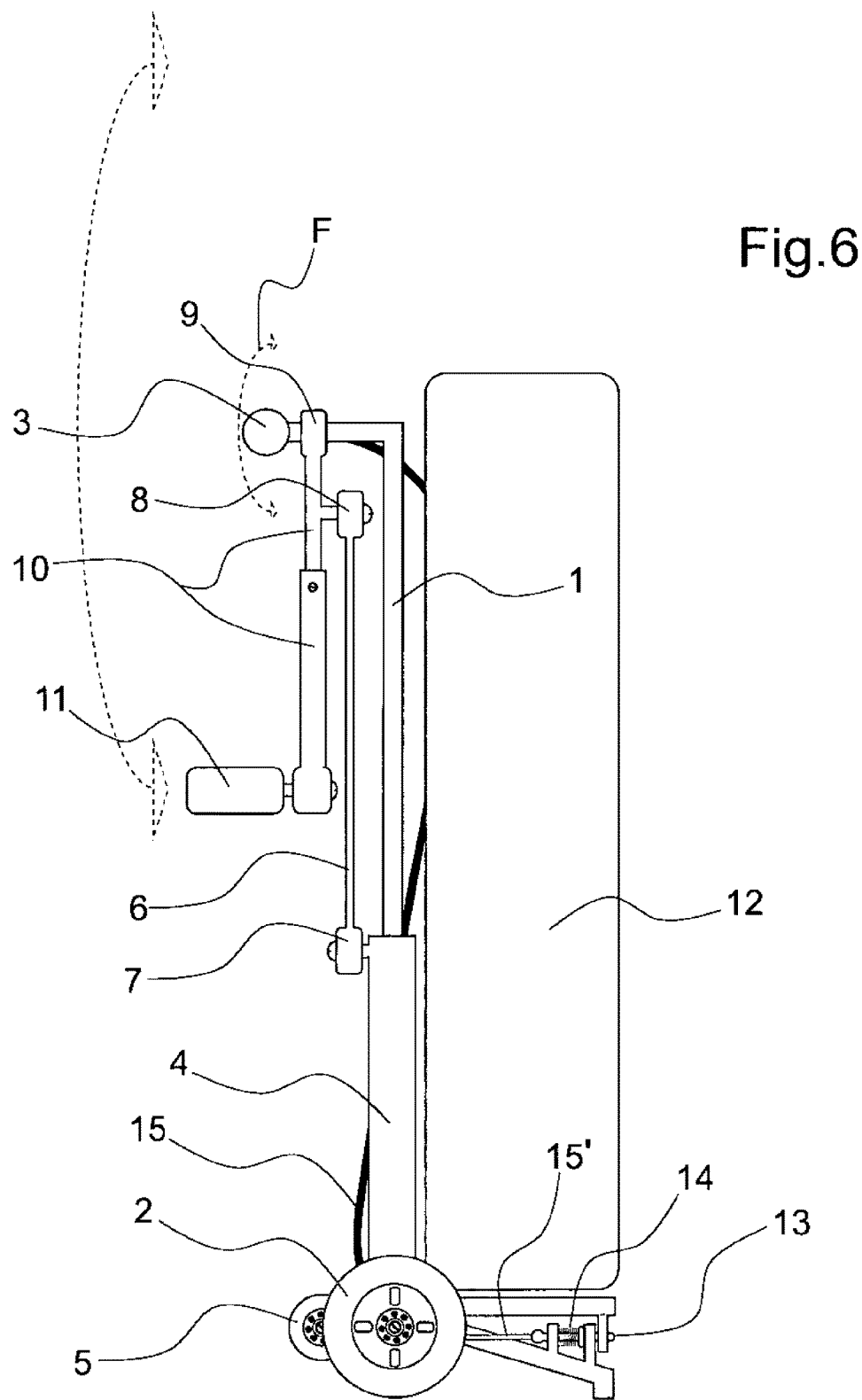
FIG. 6 shows a lateral view of the device according to the invention with the largest load and showing details of the embodiment.

It can be seen in FIGS. 5 and 6 that the telescopic arm 10 is fixed to the frame 1 parallel to a removable load 12 which is greater, allowing the telescopic lever arm 10 to be turned up and down following a circular movement according to the arrow F without being hindered by the removable load 12.

The rotary handle 11, a user aid for manipulating the telescopic lever arm 10 according to arrow F, can be seen on all the figures.

The invention claimed is:

1. A device for manually lifting a load, facilitating the ascent and descent of staircases and various obstacles, comprising:
a first part comprising a frame (1) integral with a plurality of first wheels (2), and at least one handle (3) fixed to the frame (1);
a second part comprising a load support (4) integral with at least a second wheel (5), the load support (4) configured to support a load mountable thereon, and the second part being slidable relative to the first part by the action of a lever arm (10) in order to ascend a staircase step,
wherein the lever arm (10) is fixed to a handle (3) by a first articulation (9), wherein a second articulation (8) connects the lever arm (10) to a transmission (6) which is connected by a third articulation (7) to the load support (4) of the second part.

2. The device according to claim 1, the device further comprising a joining pin (13) with a spring (14) releasably joining the first and second parts and allowing the device to move with the plurality of first wheels and the at least second wheel (2 and 5) on a plane surface.

3. A method for using a device as set forth in claim 1, the method comprising:
during a first phase, sliding the second part upward relative to the first part by turning the lever arm (10) upward in a circular movement starting from an initial low position such that said at least one second wheel moves above said plurality of first wheels,
and, during a second phase turning the lever arm (10) downward in a circular movement to the initial low position, such that said plurality of first wheels are pulled upward toward said at least one second wheel.

4. The method according to claim 3, wherein turning the lever arm (10) downward to the initial low position causes the at least second wheel to move along a direction that facilitates the movement of said plurality of first wheels toward said at least one second wheel.

5. The method as set forth in claim 2, the method comprising:
during a first phase, sliding the second part upward relative to the first part by turning the lever arm (10) upward in a circular movement starting from an initial low position such that said at least one second wheel moves above said plurality of first wheels,
and, during a second phase turning the lever arm (10) downward in a circular movement to the initial low position, such that said plurality of first wheels are pulled upward toward said at least one second wheel.

6. The method according to claim 5, wherein turning the lever arm (10) downward to the initial low position causes the at least second wheel to move along a direction that facilitates the movement of said plurality of first wheels toward said at least one second wheel.

7. The device as set forth in claim 1, wherein the at least second wheel further comprises an additional wheel integral with said load support.

8. The device as set forth in claim 1, wherein said lever arm is telescopic.

\* \* \* \* \*